(12) United States Patent
Su et al.

(10) Patent No.: US 10,557,305 B2
(45) Date of Patent: Feb. 11, 2020

(54) TRANSMISSION STOPPING DEVICE FOR CORDLESS CURTAIN

(71) Applicant: Zhejiang Wanbao Weaving and Plastics Co., Ltd., Ruian, Zhejiang (CN)

(72) Inventors: Xiaohua Su, Pingyang (CN); Kangjie Chen, Ruian (CN)

(73) Assignee: ZHEJIANG WANBAO WEAVING AND PLASTICS CO., LTD., Ruian, Zhejiang (CN)

( * ) Notice: Subject to any disclaimer, the term of this patent is extended or adjusted under 35 U.S.C. 154(b) by 180 days.

(21) Appl. No.: 15/834,002

(22) Filed: Dec. 6, 2017

(65) Prior Publication Data

US 2018/0252031 A1    Sep. 6, 2018

(30) Foreign Application Priority Data

Mar. 1, 2017   (CN) .................... 2017 2 0190941 U

(51) Int. Cl.
| | | |
|---|---|---|
| *E06B 9/324* | (2006.01) | |
| *F16D 65/02* | (2006.01) | |
| *F16D 63/00* | (2006.01) | |
| *E06B 9/322* | (2006.01) | |
| *F16H 55/17* | (2006.01) | |
| *F16H 1/06* | (2006.01) | |
| *F16D 125/36* | (2012.01) | |

(52) U.S. Cl.
CPC .............. *E06B 9/324* (2013.01); *E06B 9/322* (2013.01); *F16D 63/00* (2013.01); *F16D 65/028* (2013.01); *F16H 1/06* (2013.01); *F16H 55/17* (2013.01); *E06B 2009/3222* (2013.01); *F16D 2125/36* (2013.01); *F16H 2055/178* (2013.01)

(58) Field of Classification Search
CPC ..... E06B 2009/3222; E06B 2009/3225; E06B 9/322; E06B 9/324; E06B 9/90; E06B 9/323; F16D 2065/022; F16D 41/04; F16D 41/06; F16D 41/07; F16D 63/00; F16D 65/02; F16D 65/028; F16H 3/08; F16H 1/06; F16H 55/17; F16H 2055/178
USPC ...... 74/322, 333, 406, 411, 411.5, 412, 413, 74/421, 434, 439, 445; 192/45.001, 192/45.004, 45.005, 45.017, 223.2
See application file for complete search history.

(56) References Cited

U.S. PATENT DOCUMENTS

| | | | | |
|---|---|---|---|---|
| 1,362,011 | A * | 12/1920 | Kirby | F16D 41/066 192/45.017 |
| 1,719,881 | A * | 7/1929 | Farmer | F16D 41/064 192/45.005 |
| 5,375,643 | A * | 12/1994 | Rude | E06B 9/90 160/321 |

(Continued)

*Primary Examiner* — Victor L MacArthur
*Assistant Examiner* — Joseph Brown
(74) *Attorney, Agent, or Firm* — Leong C. Lei

(57) ABSTRACT

A transmission stopping device for a cordless curtain includes a box assembly and a stop wheel assembly disposed in the box assembly. The stop wheel assembly includes a torsion wheel and a stop wheel. The stop wheel is provided with balls therein. A rotation-stopping assembly is provided between the stop wheel and the box assembly. The cooperation between the balls of the stop wheel and the rotation-stopping assembly in the box assembly ensures that the ascent and descent of a curtain achieves an accurate positioning.

5 Claims, 6 Drawing Sheets

(56) References Cited

U.S. PATENT DOCUMENTS

| | | | |
|---|---|---|---|
| 8,893,766 B2* | 11/2014 | Bohlen | E06B 9/88 160/323.1 |
| 2014/0014279 A1* | 1/2014 | Defenbaugh | E06B 9/68 160/168.1 P |
| 2014/0083631 A1* | 3/2014 | Huang | E06B 9/322 160/170 |
| 2017/0321477 A1* | 11/2017 | Chen | E06B 9/322 |
| 2017/0356241 A1* | 12/2017 | Lin | E06B 9/262 |
| 2018/0230741 A1* | 8/2018 | Zheng | E06B 9/322 |
| 2019/0162257 A1* | 5/2019 | Shih | F16D 63/00 |

* cited by examiner

TRANSMISSION STOPPING DEVICE FOR CORDLESS CURTAIN

BACKGROUND OF THE INVENTION

1. Field of the Invention

The present invention relates to a window blind without an exposed pull rope, and more particularly to a transmission stopping device for a cordless curtain.

2. Description of the Prior Art

Curtains mainly have the functions of sunshade and protection of privacy. There are various types of curtains, such as traditional cloth curtains, retractable pleated curtains and window blinds. Traditional cloth curtains are easily affected by the impact of natural wind outside to swing, which is not beautiful and not simple enough. The process of opening and closing is more complicated. Retractable pleated curtains and window blinds are vertically ascended or descended through an exposed pull rope to be opened or closed. The exposed pull rope is easy to wind and interference with other indoor other articles. There will be a big security risk. For example, children may wind the pull rope around the neck to cause an accident.

For the problems of such curtains, those skilled in the art continue to research and develop, and there is a cordless curtain developed on the market. That is, the tension for controlling the curtain to be lifted and lowered is hidden in the curtain. There is no pull rope outside the curtain. This curtain has a transmission device for controlling the pull rope. The transmission device comprises a box body, rolled torsion springs arranged side by side in the box body, and a plurality of torsion wheels arranged side by side and meshed with each other. The pull rope is wound on the torsion wheels. Since the pull rope on the torsion wheels often slips, the curtain cannot stop when positioned. The curtain continues to open upwards. The traditional stopping method is to provide a load-bearing block under the curtain so that the lower part of the curtain stops due to its own weight. However, the installation of the load-bearing block will increase the production cost. Besides, the processing technology and the assembly process also become more complicated, which reduces the production efficiency and increases the consumer's consumption cost. Chinese patent No. CN201620428050.4 discloses a transmission stopping device for a cordless curtain. A stop wheel is provided in a box. A rotation-stopping assembly is provided between the box and the stop wheel. The rotation-stopping assembly comprises a wheel body and a wheel body rotating shaft. The box is provided with a chute corresponding in position to the stop wheel for the rotating shaft of the stop wheel to slide. At least one hook block is provided on the outer circumferential surface of the wheel body rotating shaft. The box is provided with a stop groove which is matched with the hook block. The stopping function is realized through the cooperation of the hook block and the stop groove. This method has some drawbacks. When it is used for a small curtain, because the friction and the gravity of the lower beam of the curtain is less than the force that the spring retracts the pull rope, the curtain may rebound. It is necessary to add a heavy article at the lower beam to prevent the curtain from rebounding.

Accordingly, the inventor of the present invention has devoted himself based on his many years of practical experiences to solve these problems.

SUMMARY OF THE INVENTION

In view of the shortcomings of the prior art, the primary object of the present invention is to provide a transmission stopping device for a cordless curtain.

In order to achieve the aforesaid object, the transmission stopping mechanism of the present invention comprises a box assembly and a stop wheel assembly transversely disposed in the box assembly. The stop wheel assembly includes a torsion wheel and a stop wheel. The torsion wheel and the stop wheel are arranged side by side and meshed with each other. The box assembly includes an upper cover and a lower cover. The torque wheel and the stop wheel each include a wheel body and a wheel body rotating shaft. The wheel body rotating shaft is disposed at a center of the wheel body. The wheel body rotating shaft is hollow. The lower cover is provided with a lower cover shaft corresponding in position to the wheel body rotating shaft. A cavity is provided in a center of the lower cover shaft. The upper cover is provided with an upper cover shaft corresponding in position to the wheel body rotating shaft. An outer diameter of the upper cover shaft is less than an inner diameter of the cavity of the lower cover shaft. The stop wheel is provided with balls therein. A rotation-stopping assembly is provided between the stop wheel and the box assembly.

According to the above technical solution, the stop wheel assembly is provided in the box assembly, and the balls are provided in the stop wheel assembly, and the rotation-stopping assembly is provided between the stop wheel and the box assembly. The cooperation between the balls of the stop wheel and the rotation-stopping assembly in the box assembly is to ensure that the ascent and descent of the curtain achieves an accurate positioning. According to the size and weight the specific cordless curtain, one or two stop wheel assemblies may be provided. A plurality of torsion wheels are provided between the two stop wheel assemblies. The torsion wheel at the end is engaged with the torsion wheel of the stop wheel assembly. The stop wheel assemblies at both ends have the same structure. The main difference is that the work direction is opposite and the internal structure of the stop wheel is opposite in direction.

Preferably, the rotation-stopping assembly includes a brake chamber disposed at one end of the stop wheel close to the lower cover. The brake chamber is provided with three curved walls integrally formed with the brake chamber and arranged along a circumference thereof. The curved walls are provided with hook-shaped walls integrally formed with the curved walls and equiangularly arranged. The balls are disposed in the hook-shaped walls, respectively. The stop wheel is provided with a brake chamber lid. The brake chamber lid is provided with a stop disc having an outer diameter slightly less than a circumference of the curved walls. The stop disc is provided with stop notches equiangularly arranged.

Preferably, another end of the stop wheel, opposite to the end provided with the brake chamber, is provided with a torsion spring. One end of the torsion spring, close to the upper cover, is an engaging end. The engaging end is tangent to the wheel body rotating shaft. The upper cover is provided with an annular wall around the upper cover shaft. The annular wall is provided with a notch corresponding in shape to the engaging end. The engaging end is engaged with the notch.

According to the above technical solution, the brake chamber of the stop wheel is provided with the curved walls, and the hook-shaped walls are provided with the balls therein, and the brake chamber lid is provided with the stop disc having the notch to cooperate with each other. When the stop wheel is driven by the rope to rotate, the balls in the brake chamber will be forced to roll, so that the balls will roll into the small gaps between the hook-shaped walls and the stop notches respectively, and the balls will not be able to continue moving, so that the brake chamber and the stop disc will be stuck. At this time, the stop wheel will be stuck under the action of the balls and cannot be turned toward the direction of the previous movement. It can be only moved in the reverse direction, that is, the curtain can be restored by the upward force. At this time, the torsion spring at another end of the stop wheel, opposite to the end provided with the brake chamber, is also forced to stretch. When the curtain is pulled downward to the required position by the user, the user releases the curtain and the curtain will not be subject to the force in addition to self-weight. At this time the rope will stop driving the stop wheel. At the moment of stopping the rope, the cooperation between the stop wheel and the torsion spring allows the curtain to get precise positioning during the descent of the curtain. This structure will not loosen, so the positioning effect is extremely accurate. When the curtain is pulled upward, the stop wheel is moved in a direction opposite to the direction of pull-down movement. The balls are returned. AT this time, the torsion spring will quickly return. When the curtain is pulled up to a certain position, the force to push the curtain upward is stopped. Because the torsion spring is sufficient to withstand the weight of the curtain, it will not slide down under the action of the weight of the curtain, thus ensuring accurate positioning when rising.

Preferably, the number of the balls is three.

According to the above technical solution, the number of the balls is three corresponding to the brake chamber formed by the three curved walls and the hook-shaped walls.

As long as any of the three balls enters the small gap, the stop wheel cannot continue to rotate, thereby increasing tripling stopping efficiency.

Preferably, the lower cover and the upper cover are connected through a plug-in connector.

According to the above technical solution, the mechanism assembled by the plug-in connector is convenient for disassembly and assembly, is easy to be repaired and installed, and improves the construction and maintenance efficiency.

The present invention has the beneficial effects of high production efficiency, quick construction, excellent stopping effect and long service life.

DETAILED DESCRIPTION OF THE PREFERRED EMBODIMENTS

Embodiments of the present invention will now be described, by way of example only, with reference to the accompanying drawings.

Figure 1:
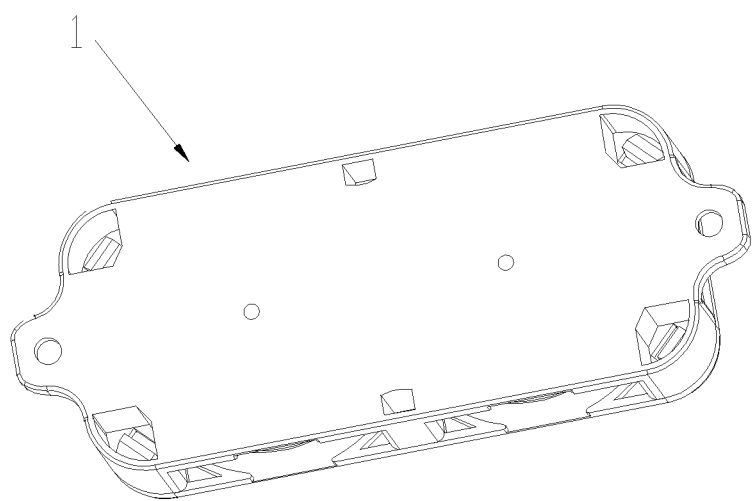
FIG. 1 is a perspective view in accordance with a preferred embodiment of the present invention.
Figure 2:
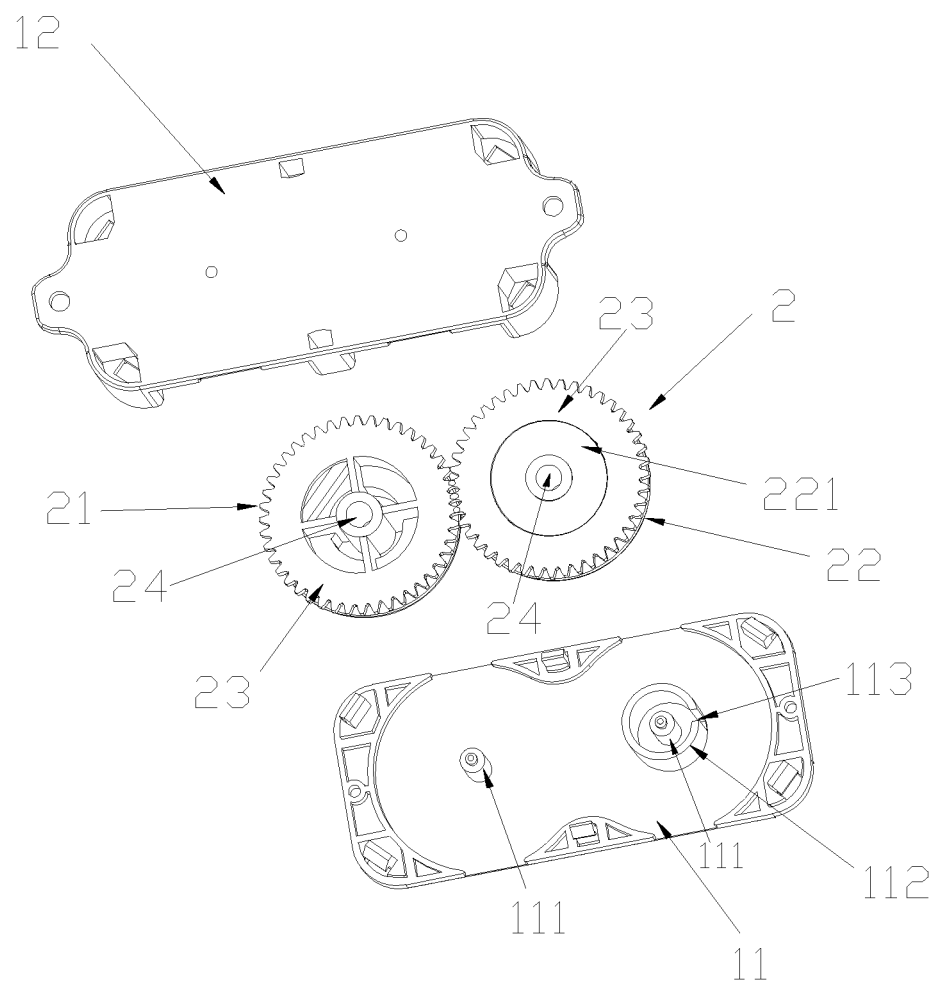
FIG. 2 is an exploded view in accordance with the preferred embodiment of the present invention.
Figure 3:
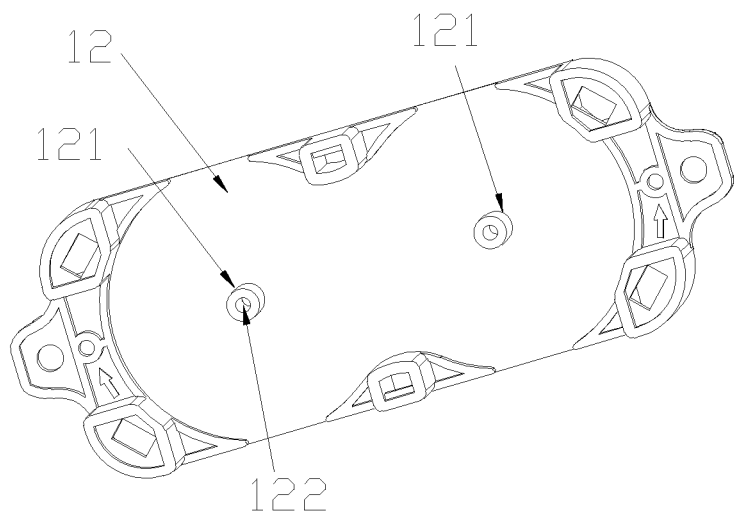
FIG. 3 is a schematic view showing the internal structure of the upper cover in accordance with the preferred embodiment of the present invention.
Figure 4:
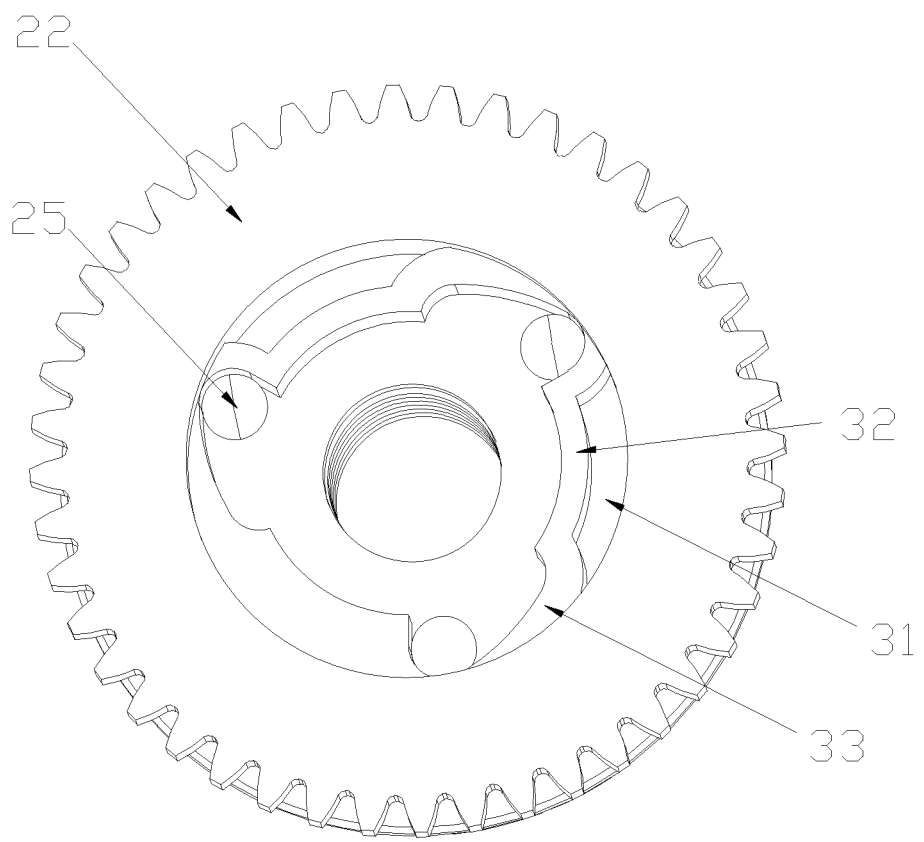
FIG. 4 is a first schematic view showing the structure of the stop wheel in accordance with the preferred embodiment of the present invention.
Figure 5:
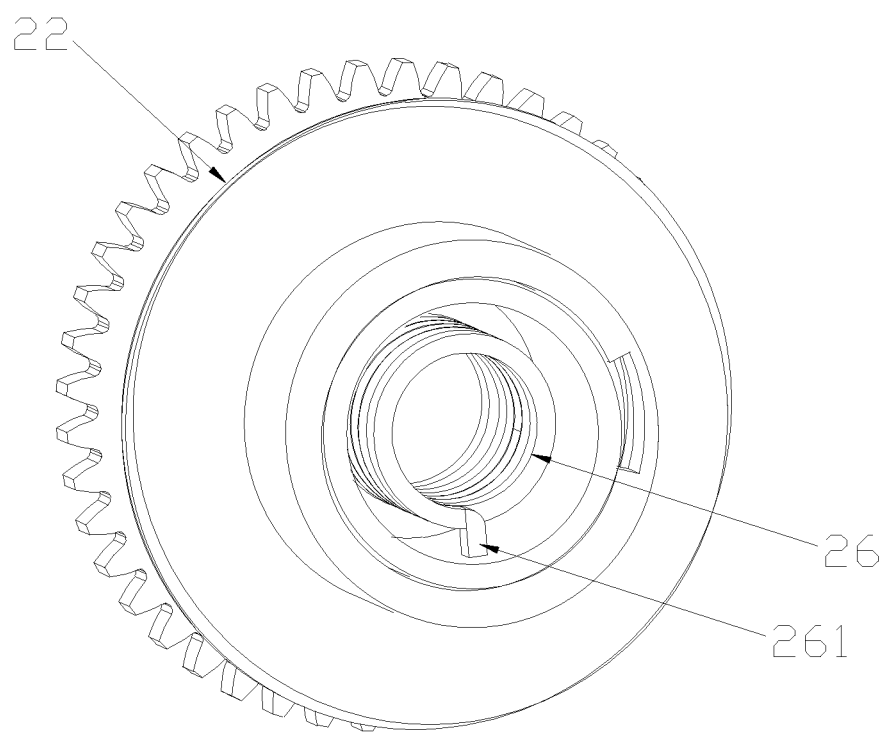
FIG. 5 is a second schematic view showing the structure of the stop wheel in accordance with the preferred embodiment of the present invention.
Figure 6:
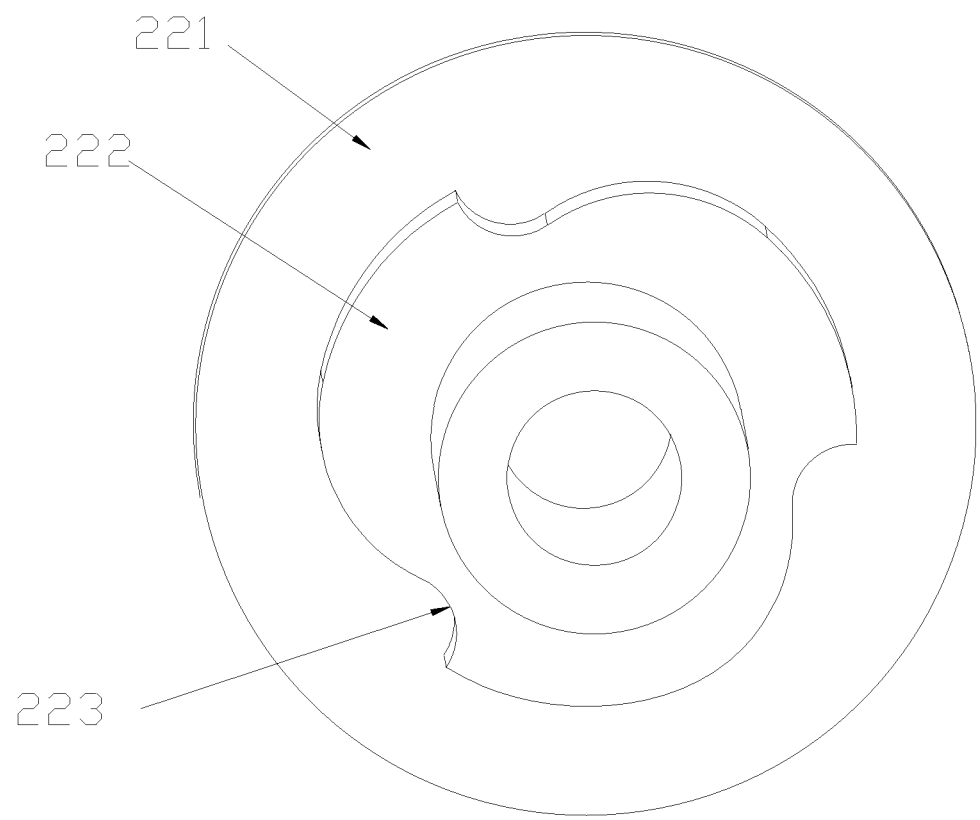
FIG. 6 is a schematic view showing the brake chamber lid in accordance with the preferred embodiment of the present invention.

Referring to FIG. 1 to FIG. 6, the present invention discloses a transmission stopping device for a cordless curtain. The transmission stopping mechanism comprises a box assembly 1 and a stop wheel assembly 2 transversely disposed in the box assembly 1. The stop wheel assembly 2 includes a torsion wheel 21 and a stop wheel 22. The torsion wheel 21 and the stop wheel 22 are arranged side by side and meshed with each other. The box assembly 1 includes an upper cover 11 and a lower cover 12. The torque wheel 21 and the stop wheel 22 each include a wheel body 23 and a wheel body rotating shaft 24. The wheel body rotating shaft 24 is disposed at the center of the wheel body 23. The wheel body rotating shaft 24 is hollow. The lower cover 12 is provided with a lower cover shaft 121 corresponding in position to the wheel body rotating shaft 24. A cavity 122 is provided in the center of the lower cover shaft 121. The upper cover 11 is provided with an upper cover shaft 111 corresponding in position to the wheel body rotating shaft 24. An outer diameter of the upper cover shaft 111 is less than an inner diameter of the cavity 122 of the lower cover shaft 121. The stop wheel 22 is provided with balls 25 therein. A rotation-stopping assembly is provided between the stop wheel 22 and the box assembly 1. The rotation-stopping assembly includes a brake chamber 31 disposed at one end of the stop wheel 22 close to the lower cover 12. The brake chamber 31 is provided with three curved walls 32 integrally formed with the brake chamber 31 and arranged along the circumference. The curved walls 32 are provided with hook-shaped walls 33 integrally formed with the curved walls 32 and equiangularly arranged. The balls 25 are disposed in the hook-shaped walls 33, respectively. The stop wheel 22 is provided with a brake chamber lid 221. The brake chamber lid 221 is provided with a stop disc 222 having an outer diameter slightly less than the circumference of the curved walls 32. The stop disc 222 is provided with stop notches 223 equiangularly arranged. Another end of the stop wheel 22, opposite to the end provided with the brake chamber 31, is provided with a torsion spring 26. One end of the torsion spring 26, close to the upper cover 11, is an engaging end 261. The engaging end 261 is tangent to the wheel body rotating shaft 24. The upper cover 11 is provided with an annular wall 112 around the upper cover shaft 111. The annular wall 112 is provided with a notch 113 corresponding in shape to the engaging end 261. The engaging end 261 is engaged with the notch 113. The number of the balls 25 is three. The lower cover 12 and the upper cover 11 are connected through a plug-in connector.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A transmission stopping device for a cordless curtain, comprising a box assembly and a stop wheel assembly transversely disposed in the box assembly, the stop wheel assembly including a torsion wheel and a stop wheel, the torsion wheel and the stop wheel being arranged side by side and meshed with each other, the box assembly including an upper cover and a lower cover, the torsion wheel having a first wheel body and a first wheel body rotating shaft disposed at a center of the first wheel body, the stop wheel having a second wheel body and a second wheel body rotating shaft disposed at a center of the second wheel body, the first and second wheel body rotating shaft being hollow, the lower cover being provided with two lower cover shafts each corresponding in position to one of the first and second wheel body rotating shafts, a center of each of the two lower cover shafts being provided with a cavity, the upper cover being provided with two upper cover shafts each corresponding in position with one of the first and second wheel body rotating shafts, an outer diameter of the two upper cover shafts being less than an inner diameter of the cavity of the two lower cover shafts, the stop wheel being provided with balls therein, a rotation-stopping assembly being provided between the stop wheel and the box assembly;

wherein the rotation-stopping assembly includes a brake chamber disposed at one end of the stop wheel, the brake chamber is provided with three curved walls integrally formed with the brake chamber and arranged along a circumference thereof, the curved walls are provided with hook-shaped walls integrally formed with the curved walls and equiangularly arranged, the balls are disposed in the hook-shaped walls respectively, the stop wheel is provided with a brake chamber lid, the brake chamber lid is provided with a stop disc having an outer diameter slightly less than a circumference of the curved walls, and the stop disc is provided with stop notches equiangularly arranged, and wherein another end of the stop wheel, opposite to the end provided with the brake chamber, is provided with a torsion spring, one end of the torsion spring is an engaging end, the engaging end is tangent to the wheel body rotating shaft, the upper cover is provided with an annular wall around the upper cover shaft, the annular wall is provided with a notch corresponding in shape to the engaging end, and the engaging end is engaged with the notch.

2. The transmission stopping device as claimed in claim 1, wherein the number of the balls is three.

3. The transmission stopping device as claimed in claim 1, wherein the lower cover and the upper cover are connected through a plug-in connector.

4. The transmission stopping device as claimed in claim 1, wherein the lower cover and the upper cover are connected through a plug-in connector.

5. The transmission stopping device as claimed in claim 1, wherein the lower cover and the upper cover are connected through a plug-in connector.

* * * * *